Nov. 2, 1926.

S. R. TYMSTRA ET AL 1,605,083

GAS MANUFACTURE

Filed March 2, 1925      3 Sheets-Sheet 1

INVENTOR
Sybren R. Tymstra
& Olav Sveit
BY
King Harness
ATTORNEY

Nov. 2, 1926.

S. R. TYMSTRA ET AL 1,605,083

GAS MANUFACTURE

Filed March 2, 1925     3 Sheets-Sheet 2

INVENTOR
Sybren R. Tymstra
& Olav Sweit
BY
       King Harness
ATTORNEY

Nov. 2, 1926.

S. R. TYMSTRA ET AL 1,605,083

GAS MANUFACTURE

Filed March 2, 1925  3 Sheets-Sheet 3

INVENTOR
Sybren R. Tymstra
& Olav Sweit
BY
Irving Harness
ATTORNEY

Patented Nov. 2, 1926.

1,605,083

UNITED STATES PATENT OFFICE.

SYBREN R. TYMSTRA AND OLAV TWEIT, OF DETROIT, MICHIGAN, ASSIGNORS TO STEERE ENGINEERING COMPANY, OF DETROIT, MICHIGAN, A CORPORATION OF MICHIGAN.

GAS MANUFACTURE.

Application filed March 2, 1925. Serial No. 12,539.

Our invention has particular reference to means for opening and closing valves and caps, such as are ordinarily employed in gas making plants. Valves and caps of this nature are in themselves large and heavy so as to require considerable force to be exerted upon them for opening and closing them, and the force or pressure oftentimes applied against them by the gases in the plant when they are closed adds materially to the final force necessary to be applied in the normal operation of the same. Furthermore, it is necessary that these heavy and cumbersome valves and caps be brought to their seats with a cushioned effect in distinction to a clash or heavy impact, which would tend to disintegrate them or portions of the plant.

It is, therefore, the primary object of our invention to provide simple, positive and easily controlled means for operating such devices. In the working out of this primary object, we utilize a hydraulically operated piston, to which is connected by means of a rack and sector gear a toggle arrangement of levers adapted, upon movement of the piston, to give acceleration to the valve or cap with a deceleration of power upon the first movement of the piston and a deceleration of movement with an acceleration of power upon the final movement of the piston with the resulting effect of bringing the valve or cap to its seat under great power but with a slow and cushioning movement.

Other, and further objects of our invention will be apparent from the detailed description following in conjunction with the accompanying drawings, in which.

Figure 1:
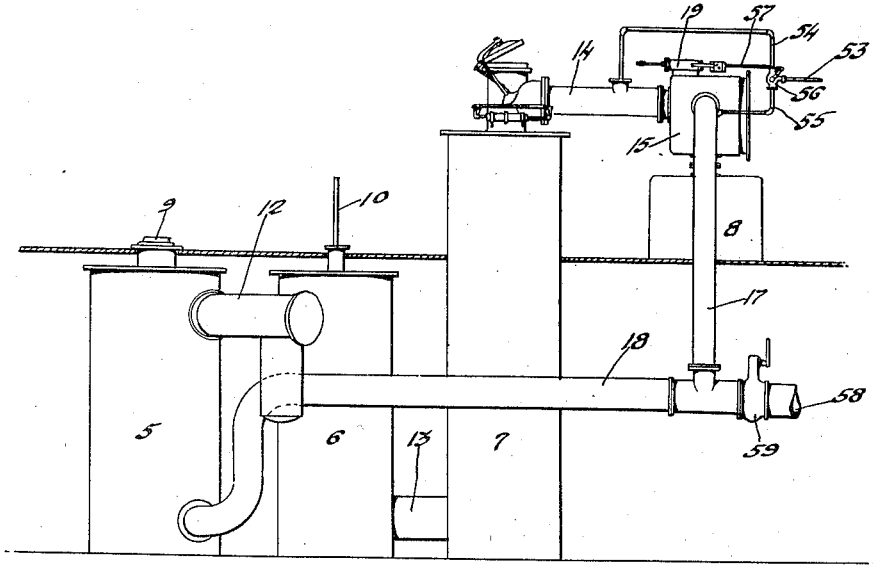
Fig. 1 is a side elevation of a gas plant embodying our invention.
Figure 4:
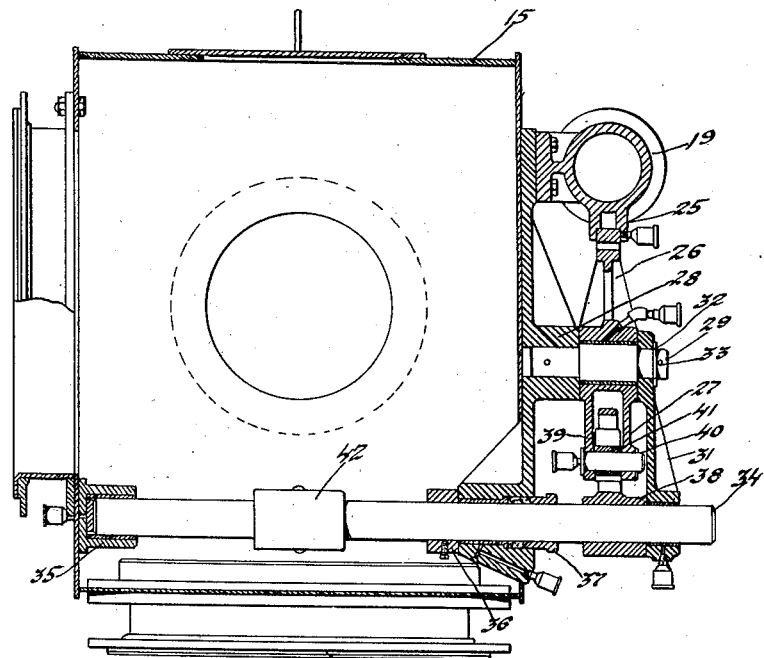
Fig. 4 is a sectional view of our improved device taken on line 4—4 of Fig. 3.
Figure 2:
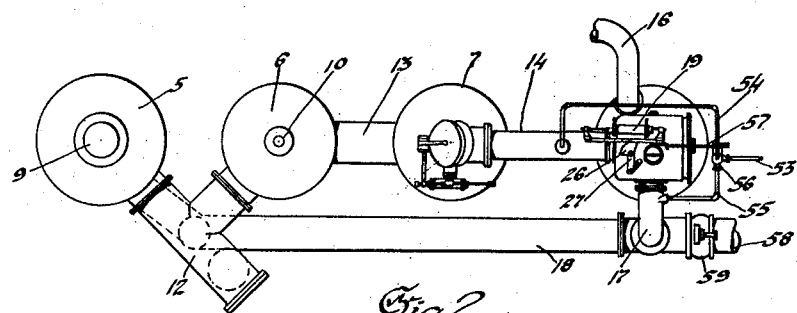
Fig. 2 is a plan view of a gas plant showing our invention secured thereto.

We have shown a gas plant consisting of a generator 5, a carburetor 6, a superheater 7 and a wash-box 8. The customary fuel opening 9 for the generator and the oil spray opening 10 for the carburetor are shown more or less diagrammatically inasmuch as they form no part of our invention.

Suitable connections for the various elements are provided as in the conduit 12 leading from the generator to the carburetor, the conduit 13 leading from the carburetor to the superheater and the off-take conduit 14 leading from the superheater through the valve housing 15 into the wash-box 8. A gas off-take passage 16 leads from the wash-box 8 to the gas container and a passage 17 leads from the housing 15 through the passage 18 into the bottom of the generator.

Positioned on the housing 15 is the cylinder 19 within which is positioned a conventional piston adapted to be reciprocated by hydraulic power introduced through the conduits 96. The hydraulic pressure applied may be governed in various manners, but we have provided a simple control which consists in placing a disc 97 within the conduits having an orifice 98 therein of suitable size to limit the velocity, according to the particular requirements. The piston has a piston shaft 20 that has the rack 21 with the teeth 22 secured thereto by means of the brackets 23 and the bolts 24. A guide-way 25 is provided for the rack 21 on the cylinder 19. The sector gear 26 with the end 27 is pivoted on a bearing 28 by the pin 29 so that the gear teeth 30 mesh with the teeth 22. The bearing support 31 is placed on the pin 29 and secured by the washer 32 and the cotter key 33.

A shaft 34 is fitted into the housing 15 by means of the bearing 35, the collar 36, gland 37 and the bearing 31. One end of the shaft 34 is provided with the lever 38 that has the slot 39 therein. The pin 40 with the roller 41 thereon connects the end 27 of the gear 26 to the lever 38 so that the roller 41 can reciprocate back and forth in the slot 39.

An arm 42 is placed on the shaft 34. A pair of separate plates 43 and 44 are loosely secured to the arm 42 by the bolt 45 that has its head 46 resting in the socket 47 of the plate 43 and the lock nuts 49 that are threaded on the end of the bolt 45 in the socket 48 of the plate 44. A pin 50 prevents the bolt 45 from turning in the arm 42. Covers 51 are fitted over the sockets 47 and 48 by the nuts 52 to prevent leakage.

It will be noted that the head 46 of the bolt 45 is beveled; that the lock nuts 49 do not come in contact with the inner surface of the socket 48 and that the sockets 47 and 48 are rounded where they are secured to the arm. Thus, universal movement of at least five degrees is permitted when the said plates are being located on the portions of the passages that they close. This construction allows the plates to first find their seats and then to become firmly fixed thereon.

The shaft 34 is so positioned in the housing 15 that when it is rotated in one direction the plate 43 will engage the mouth of the vertical portion of the passage 17, while when the shaft is moved in the opposite direction, the plate 44 will engage the face of the horizontal portion of the passage 14.

For the introduction of steam into the system, we utilize a passage 53 which communicates with the passages 54 and 55, the passage 54 leading into the passage 14 and the passage 55 leading into the passage 17. A double acting valve is positioned at the junctures of the passages 53, 54 and 55, as at 56, and the operation thereof is controlled by means of the lever 57 attached to the end of the rack 21, so that steam may be alternately passed into the passages 14 and 18, dependent upon movement of the piston, and consequently the position of the valve.

The passage 58 is utilized for blasting, being connected with the generator 5 through the passage 18. When the blasting is discontinued, the valve 59 is closed so as to permit the use of the passage 18 for other purposes.

Figure 3:
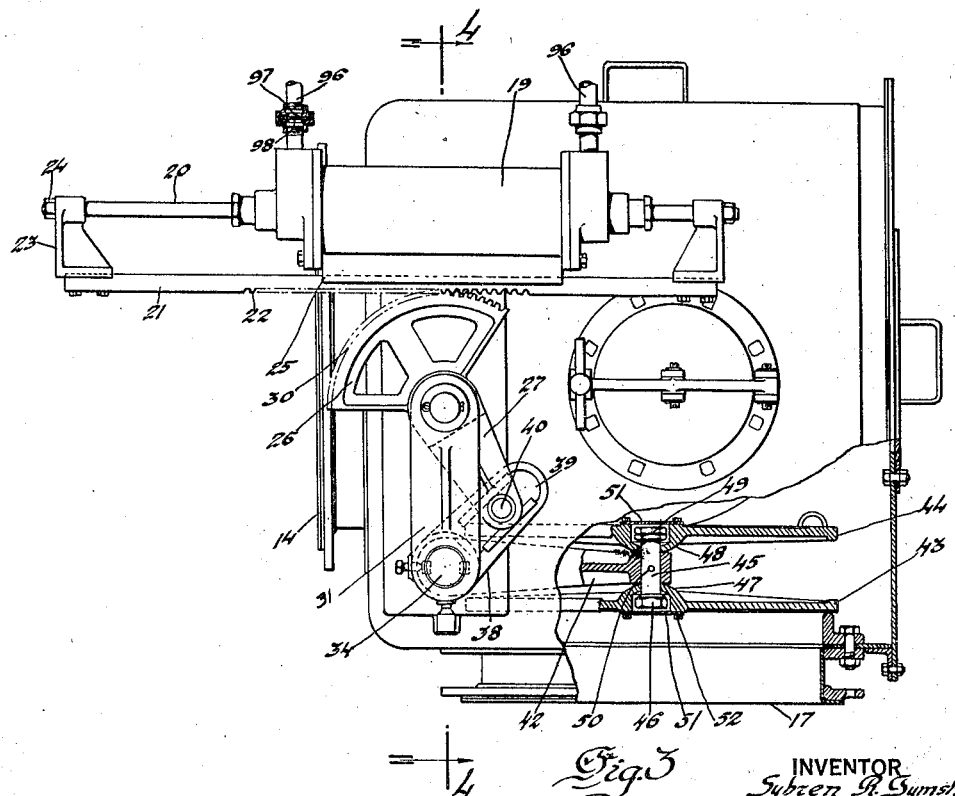
Fig. 3 is a plan view of our improved device, shown partly in section.

It will thus be seen that in making an "up run", steam is passed through the passage 53, 55, 17 and 18 into the bottom of the generator and gases are carried from the top of the generator through the passage 12 to the carburetor 6, through the passage 13, into the superheater 7, through the off-take 14 and the housing 15 into the wash-box 8. During this operation, the plates 44 and 43 are in such position as to close the housing 15 to the passage 17, as shown in Fig. 3.

In making a "back run", the hydraulic cylinder 19 is operated so that the rack 21 will cause the gear 26 to move in one direction, thereby reciprocating the pin 40 in the slot 39, and thus forcing the lever 38 to turn so as to reverse the plates 43 and 44 and close the passage between the housing 15 and the passage 14, at the same time closing, through the valve 56, communication between the passage 53 and 55, and permitting steam entering the passage 53 to be directed through the passage 54 into the off-take 14 from whence it follows through the superheater 7, the passage 13, the carburetor 6, the passage 12 and the generator 5, into the passage 18, and thence through the passage 17 into the housing 15 and the wash-box 8.

Figure 5:
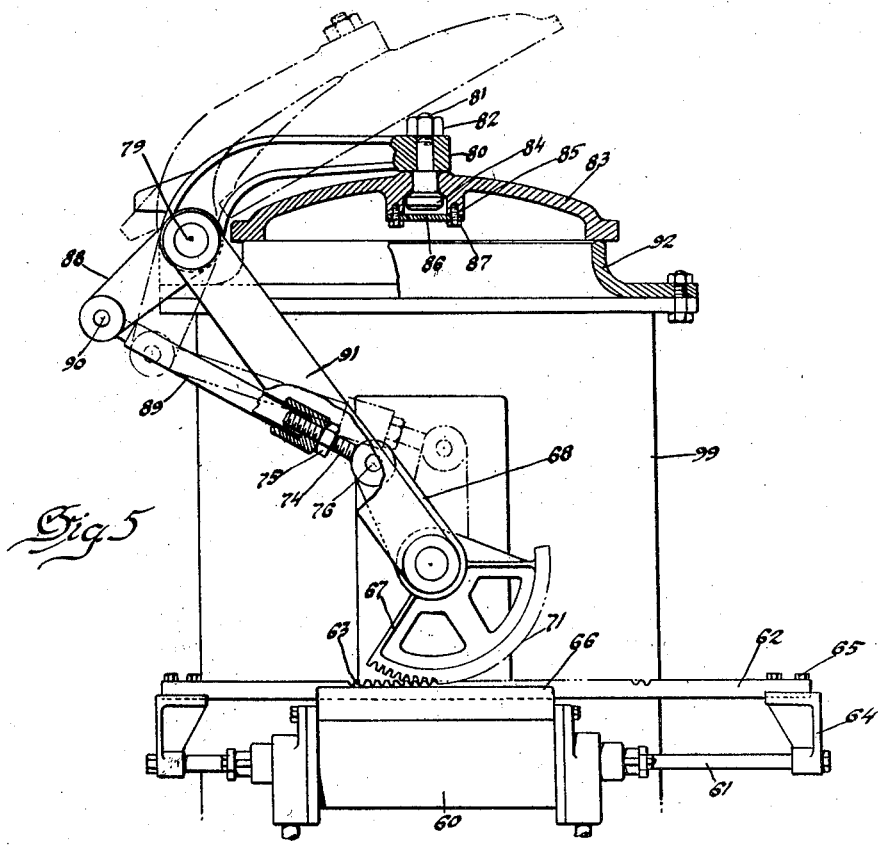
Fig. 5 is a side elevation showing our improved device as applied to stack caps for gas plants.
Figure 6:
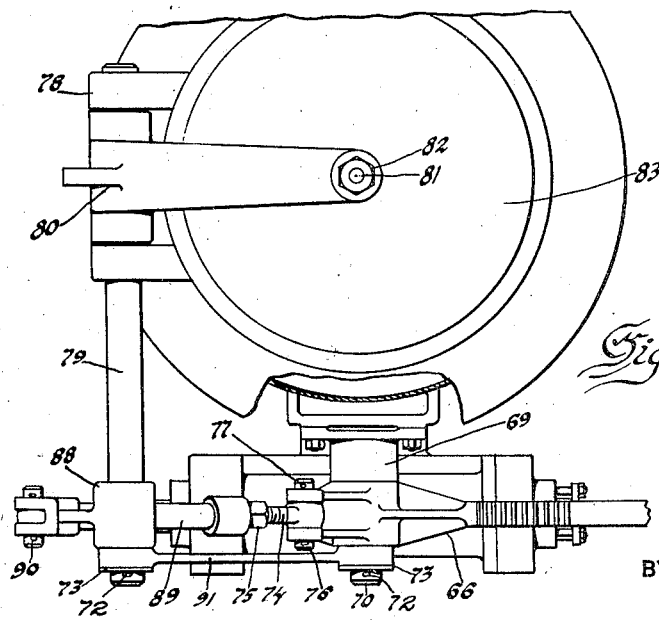
Fig. 6 is a plan view showing our improved device as applied to gas plant stack caps.

Figs. 5 and 6 show our invention as applied to a gas plant stack cap, wherein we have provided the superheater 7 with a stack 99, on which is positioned another hydraulic cylinder 60 with the piston shaft 61 that has the rack 62 with the teeth 63 secured thereto by means of the brackets 64 and the bolts 65. A guide-way 66 is provided for the rack 62 on the cylinder 60. The sector gear 67 with the end 68 is pivoted on the bearing 69 by the pin 70 so that the gear teeth 71 may mesh with the teeth 63. A toggle bolt 74 is fitted into the end 68 of the sector gear 67 by the pin 76 and the cotter keys 77.

On the stack 99 are placed the shaft supports 78, into which is fitted the shaft 79. An arm 80, which has the stop valve cover 83, secured thereto by means of the bolt 81 and the nut 82, is firmly fastened to the shaft 79. The head 84 of the bolt 81 is adapted to rest in the socket 85 of the valve cover 83 and the cover plate 86 is placed on the open end of the socket 85 by the bolts 87.

Positioned on one end of the shaft 79 is the lever 88 that has the rod 89 fitted into the end thereof by the pin 90. This rod 89 connects with the toggle bolt 74 and is held in place by the nut 75. A supporting rod 91 extends from the pin 70 to the end of the shaft 79 and is made secure by the washers 73 and the cotter keys 72.

Thus, when the rack 62 is moved in one direction by the piston shaft 61, the gear 67 will also move so as to force the turning of the shaft 79 by means of the toggle bolt 74, the rod 89 and the lever 88. The turning of the shaft 79 forces the arm 80 to rise so that the valve cover 83 will be lifted from the flange seat 92 that is on the stack 99. To lower the valve cover 83, the piston shaft 61 is moved in the opposite direction, thereby, through the use of the toggle means formed by the gear 67, the toggle pin 74, the rod 89 and the lever 88, the valve is lowered with a positive movement to its original position on the stack 99.

It will be noted that with the foregoing construction, the power exerted upon the valve disc on the stack 99 and the two-way valve disc in the housing 15, is first decreased in proportion to the increased speed of the toggle assembly that moves the same. The power then proportionately increases with the decrease in moving speed of the assembly and reaches its maximum at the end of the travel of the disc, thereby firmly positioning the discs on their seat so as to counteract the forces exerted against their closing, and at the same time prevents a sudden and harsh contact of the discs with their seat.

It is obvious that various changes may be made in the arrangement, combination and construction of the various parts of our improved device without departing from the spirit of our invention, and it is our intention to cover by our claims such changes as may be reasonably included within the scope thereof.

What we claim is:

1. In combination, a shaft, means for moving the shaft, an arm mounted on said shaft, one or more plates having a socket in the center thereof, securing means positioned in said socket and loosely fastening said plate to said arm to allow limited movement of said plate on said securing means and a cover placed over said socket to prevent leakage.

2. In combination, shaft supports, a shaft positioned therein, an arm secured to said shaft and one or more plates fitted to said arm, a hydraulic cylinder, a piston rod extending from both ends of said cylinder, means for reciprocating said rod in said cylinder, a rack placed on said piston rod, a sector gear with a lever integral therewith meshing with said rack and means connecting said gear and shaft, whereby said shaft and said plate can be partially rotated by said piston rod.

3. In combination, shaft supports, a shaft positioned therein, an arm secured to said shaft and one or more plates fitted on said arm, a hydraulic cylinder, a piston rod extending from both ends of said cylinder, means for reciprocating said rod in said cylinder, a rack placed on said piston rod, a sector gear meshing with said rack and means consisting of a toggle arrangement of levers cooperating with said gear, whereby said shaft and said plate can be partially rotated with a positive movement by said piston rod.

4. In combination, shaft supports, a shaft positioned therein, an arm having a plate secured thereto placed on said shaft, a hydraulic cylinder, a reciprocating piston in said cylinder, a sector gear having a lever integral therewith, means on said piston whereby said gear can be partially rotated back and forth by said piston, a toggle bolt fitted onto said lever, a rod secured to said bolt and a lever positioned on said shaft that connects with said rod, adapted to partially rotate said shaft and said plate when said gear is rotated.

5. In combination, shaft supports, a shaft positioned therein, a hydraulic cylinder, a piston rod extending from both ends of said cylinder, means for reciprocating said rod in said cylinder, a rack placed on said piston rod, a pivoted sector gear having a lever integral therewith meshing with said rack whereby said gear can be rotated back and forth by said piston rod, a toggle bolt fitted on to said lever, a rod secured to said bolt and a lever positioned on said shaft that connects with said rod so that said shaft can be rotated when said gear is rotated.

SYBREN R. TYMSTRA.
OLAV TWEIT.